United States Patent [19]

Katsukawa

[11] Patent Number: 4,894,712
[45] Date of Patent: Jan. 16, 1990

[54] DENSITY GRADATION CONTROL TYPE THERMAL PRINTER

[75] Inventor: Tadashi Katsukawa, Osaka, Japan

[73] Assignee: NEC Home Electronics Ltd., Osaka, Japan

[21] Appl. No.: 261,616

[22] Filed: Oct. 24, 1988

[30] Foreign Application Priority Data

Oct. 23, 1987 [JP] Japan ................................. 62-267424
Apr. 27, 1988 [JP] Japan ................................. 63-104983

[51] Int. Cl.⁴ .......................................... G01D 15/10
[52] U.S. Cl. .............................. 346/76 PH; 358/298; 400/120
[58] Field of Search ............................. 358/298, 283; 346/76 PH; 400/120; 219/216 PH

[56] References Cited

U.S. PATENT DOCUMENTS

4,532,523 7/1985 Tanaka ............................ 346/76 PH

Primary Examiner—B. A. Reynolds
Assistant Examiner—Scott A. Rogers
Attorney, Agent, or Firm—Cushman, Darby & Cushman

[57] ABSTRACT

Disclosed is a density gradation control type thermal printer which comprises: a plurality of heating resistor elements arranged so as to correspond to a plurality of picture elements on every print line with one-to-one correspondency; selectively energizing the heating resistor elements be in current conduction each for a time of an integer multiple of a current conduction unit time for every print line to thereby give density gradation to the picture elements; and selectively energizing the heating resistor elements in a descending order of current/conduction time for every print line, and making the heating resistor elements terminate current conduction at the same time or in the ascending order of current conduction time.

5 Claims, 6 Drawing Sheets

DENSITY GRADATION CONTROL TYPE THERMAL PRINTER

BACKGROUND OF THE INVENTION

The present invention relates to a thermal printer in which density gradation of each picture element is controlled by causing a current to flow into each heating resistor element for a current conduction time of an integer multiple of a current conduction unit time, and particularly relates to a thermal printer in which a power supply circuit for driving heating resistor elements has its load reduced, or has its arrangement simplified and in which the recording quality is made stable.

In such a thermal printer, the current conduction time for each heating resistor element of a thermal head is controlled to thereby make the heating energy of the heating resistor element have gradation so as to give gradation to the transfer quantity of ink and hence to the density of the picture.

Figure 1:
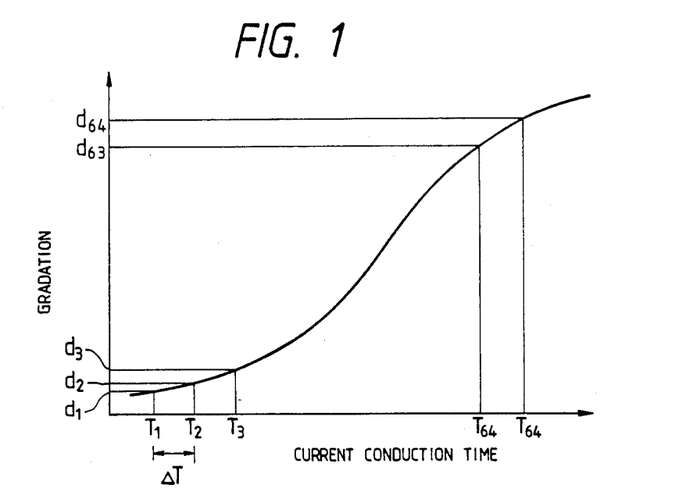
FIG. 1 is a diagram illustrating a current-conduction-time-to-density characteristic curve used in a density gradation control system.

FIG. 1 shows a current-conduction-time-to-density characteristic curve used in a density gradation system. If a current is made to flow in a heating resistor element for a current conduction time $T_1$ corresponding to a current conduction unit time $\Delta T$, the density of a gradation level $d_1$ is obtained, and if a current is made to flow in the heating resistor element for a current conduction time $T_2$ corresponding to double of the current conduction unit time $\Delta T$, the density of a gradation level $d_2$ is obtained. In this example, if a current is made to flow in the heating resistor element for a current conduction time $T_{64}$ corresponding to 64 times the current conduction unit time $\Delta T$, the density of a maximum gradation level $d_{64}$ near saturation density is obtained.

Figure 2:
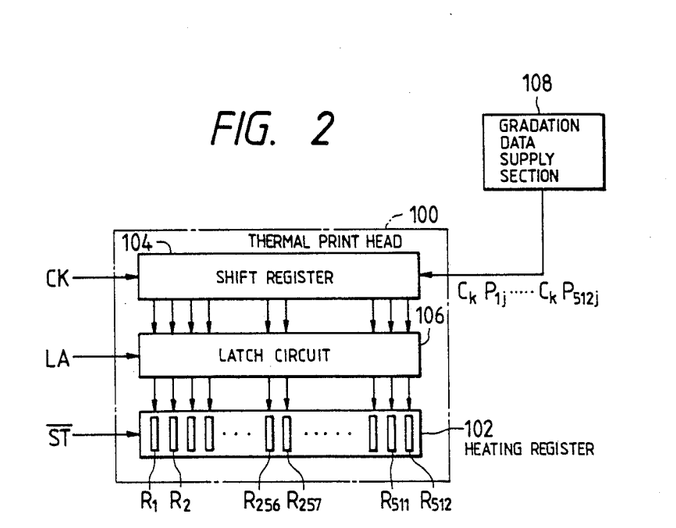
FIG. 2 is a block diagram illustrating a main arrangement of a conventional density gradation control type thermal printer.

FIG. 2 schematically shows a main arrangement of a conventional density gradation control type thermal printer. A thermal print head 100 is provided with a heating resistor 102 constituted by an array of a plurality (for example, 512 pieces) of heating resistor elements $R_1$ to $R_{512}$, a shift register 104 and a latch circuit 106, each of the shift register 104 and the latch circuit 106 having a capacity of bits equal in number (512) to the number of resistor elements. A gradation data supply section 108 supplied with 512 bits of serial gradation data $[C_K P_{1j} - C_K P_{512j}]$ supplies the gradation to the shift register 104 plural times, for example, 64 times ($K = 1$–$64$), successively at regular intervals. Here, the gradation data $C_K P_{nj}$ of the n-th bit includes information as to whether a current is to be made to flow into the n-th heating resistor element $R_n$ for the current conduction unit time $\Delta T$ or not. Specifically, if the information is "1", it indicates current conduction, and if "0", it indicates non-conduction.

Then, if the gradation data $C_K P_{1j}$ to $C_K P_{512j}$ in each time have been loaded into the shift register 104 in synchronism with a clock signal CK, the gradation data $C_K P_{1j}$ to $C_K P_{512j}$ at the respective bits of the shift register 104 are fed in the form of electric pulses to the heating resistor 102 through the latch circuit 106, so that currents are made to flow selectively into the heating resistor elements $R_1$ to $R_{512}$ for the current conduction unit time $\Delta T$ in accordance with the contents of information of the corresponding bits so that the heating resistor elements $R_1$ to $R_{512}$ generate heat selectively.

Such an operation is repeatedly carried out 64 times ($K = 1$–$64$) per print line in accordance with the gradation data in a period (in a conduction mode) during which a strobe signal $\overline{ST}$ is generated, so that the current conduction for the current conduction time $T_{64}$ corresponding to 64 times the current conduction unit time $\Delta T$ is performed at its highest limit to thereby make it possible to give any one of 64 density gradation levels to each of the picture elements on each print line.

That is, corresponding to the number of times of the gradation data during which the gradation bit $C_K P_{nj}$ continuously has its information contents being "1", the number of times of current conduction to the corresponding heating resistor element $R_n$ is determined, so that the gradation level of density of the corresponding picture element is determined. For example, assume that the gradation bit $C_K P_{1j}$ for the heating resistor element $R_1$ continues being a "1" until the tenth gradation data, then the bits $C_1 P_{1j}$ to $C_{10} P_{1j}$ become "1" respectively and the bits $C_{11} P_{1j}$ to $C_{64} P_{1j}$ become "0" respectively, so that a current is made to flow into the heating resistor element $R_1$ for a current conduction time $T_{10}$ corresponding to ten times the current conduction unit time $\Delta T$, and the density gradation level of the corresponding picture element becomes $d_{10}$. If the gradation bit $C_K P_{2j}$ for the the heating resistor element $R_2$ continues being a "1" until the seventh gradation data, then the bits $C_1 P_{2j}$ to $C_7 P_{2j}$ become "1" respectively and the bits $C_8 P_{2j}$ to $C_{64} P_{2j}$ become "0" respectively, so that a current is made to flow into the heating resistor element $R_2$ for a current conduction time $T_7$ corresponding to seven times the current conduction unit time $\Delta T$ and the density gradation level of the corresponding picture element becomes $d_7$ (referring to FIG. 1).

As described above, conventionally, if the current conduction mode is started, all the heating resistor elements corresponding to the picture elements to be recorded start current conduction simultaneously with each other, and the respective picture elements are given their density gradation corresponding to the length of time from the initiation of the current conduction to the point of time when the current conduction of the corresponding heating resistor elements terminates.

However, since the heating resistor elements start current conduction simultaneously with each other as soon as the current conduction mode is started, the sum of the currents flowing into the whole of the heating resistor elements increases suddenly, so that the driving voltage applied to the respective heating resistor elements drops down suddenly due to the steep current surges.

Figure 3:
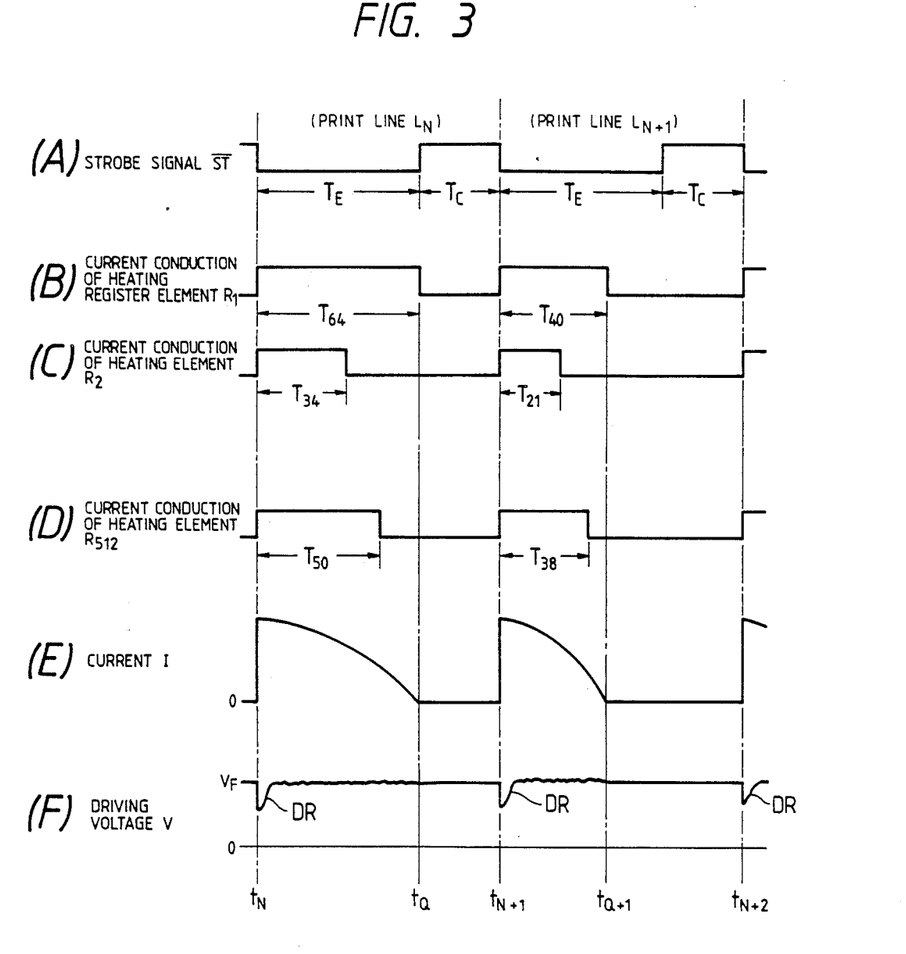
FIG. 3 is a timing chart for explaining the operation of the conventional thermal printer.

FIG. 3 shows the above status. In a period TE (the current conduction mode) in which the strobe signal $\overline{ST}$ (FIG. 3A) is "0", the heating resistor elements $R_1$ to $R_{512}$ are subject to current conduction for the time corresponding to the density gradation of the corresponding picture elements to be recorded. For example, on a print line $L_N$, the heating resistor element $R_1$ (FIG. 3B) is subject to current conduction until the maximum time $T_{64}$ to thereby record a picture element with the maximum density gradation $d_{64}$, and the heating resistor element $R_2$ (FIG. 3C) is subject to current conduction for the time $T_{34}$ to thereby record a picture element with an almost medium density gradation $d_{34}$. A period TC in which the strobe signal $\overline{ST}$ is "1" is a cooling mode. The period TC of the cooling mode is selected to be a time having the length as long as the necessary minimum for cooling the heating resistor elements heated by current conduction for the maximum permitted current conduction time ($T_{64}$).

In printing of a print line $L_N$ or $L_{N+1}$, immediately after the starting point of time $t_N$ or $t_{N+1}$ in the current conduction mode TE, all the heating resistor elements $R_1, R_2, \ldots, R_{512}$ except the heating resistor elements not to record picture elements are subject to current conduction at the same time, so that the current I supplied to the whole of the heating resistor elements (hereinafter referred to as a whole conduction current) increases suddenly (FIG. 3E). Then, the voltage drop in the conductors, such as cables, printed wires, and so on connecting a power supply circuit to the heating resistor elements rises suddenly, so that the driving voltage V actually applied to the heating resistor elements drops down largely (FIG. 3F). After this voltage drop DR, the driving voltage V is made to come back to a reference value $V_F$ by the operation of voltage compensation. That is, used is a voltage compensating circuit in which the driving voltage V is detected and fed back to the power supply circuit so as to keep the driving voltage V constant.

However, if the response of the voltage compensating circuit is low, it takes some time for the recovery of the driving voltage V, so that it is necessary to make a design to prolong the current conduction time of the heating resistor elements correspondingly for the sake of the guarantee of recording quality. This is not preferable in that not only the adjustment is difficult, but also that time required for printing is prolonged.

If a voltage compensating circuit of the high speed response type is used, the apparatus is considerably expensive and the above-mentioned problem cannot be fundamentally solved correspondingly to the cost.

SUMMARY OF THE INVENTION

It is therefore an object of the present invention to solve the foregoing problems in the prior art.

It is another object of the present invention to provide a density gradation control type thermal printer in which a sudden change can be prevented from occurring in the driving voltage of the heating resistor elements to make it possible to reduce the load of the power supply circuit, to simplify the arrangement of the power supply circuit, and to stabilize the recording quality.

To attain the foregoing objects, according to the present invention, the density gradation control type thermal printer comprises: a plurality of heating resistor elements arranged so as to correspond to a plurality of picture elements on every print line with one-to-one correspondency; means for selectively making the heating resistor elements be in current conduction each for a time of an integer multiple of a current conduction unit time for every print line to thereby give density gradation to the picture elements; and means for selectively making the heating resistor elements start current conduction in the descending order of current conduction time for every print line, and making the heating resistor elements terminate current conduction at the same time.

In printing for each print line, since current conduction of the heating resistor elements is started in the descending order of current conduction time, the current supplied to the whole of the heating resistor elements increases with the increase in number of the heating resistor elements which have started current conduction, and the current becomes zero suddenly at the point of time of the end of the current conduction mode (because the current conduction of all the heating resistor elements terminate at the same time).

Consequently, the driving current applied to the heating resistor elements is kept at a substantially constant value under the condition that the current is increased by the operation of a voltage compensating circuit.

As has been described, according to the present invention, since there occurs no sudden change in the driving voltage in the current conduction mode, it is not necessary to use a voltage compensating circuit of a high speed response type especially, and it is possible to obtain stable recording quality evne in the case of using a voltage compensating circuit which is low in response speed and which is inexpensive.

BRIEF DESCRIPTION OF THE DRAWINGS

Other features and advantages of the present invention will be apparent form the following description taken in connection with the accompanying drawings, wherein.

DESCRIPTION OF THE PREFERRED EMBODIMENTS

A first embodiment of the present invention will be described with reference to FIGS. 4 and 5.

Figure 4:
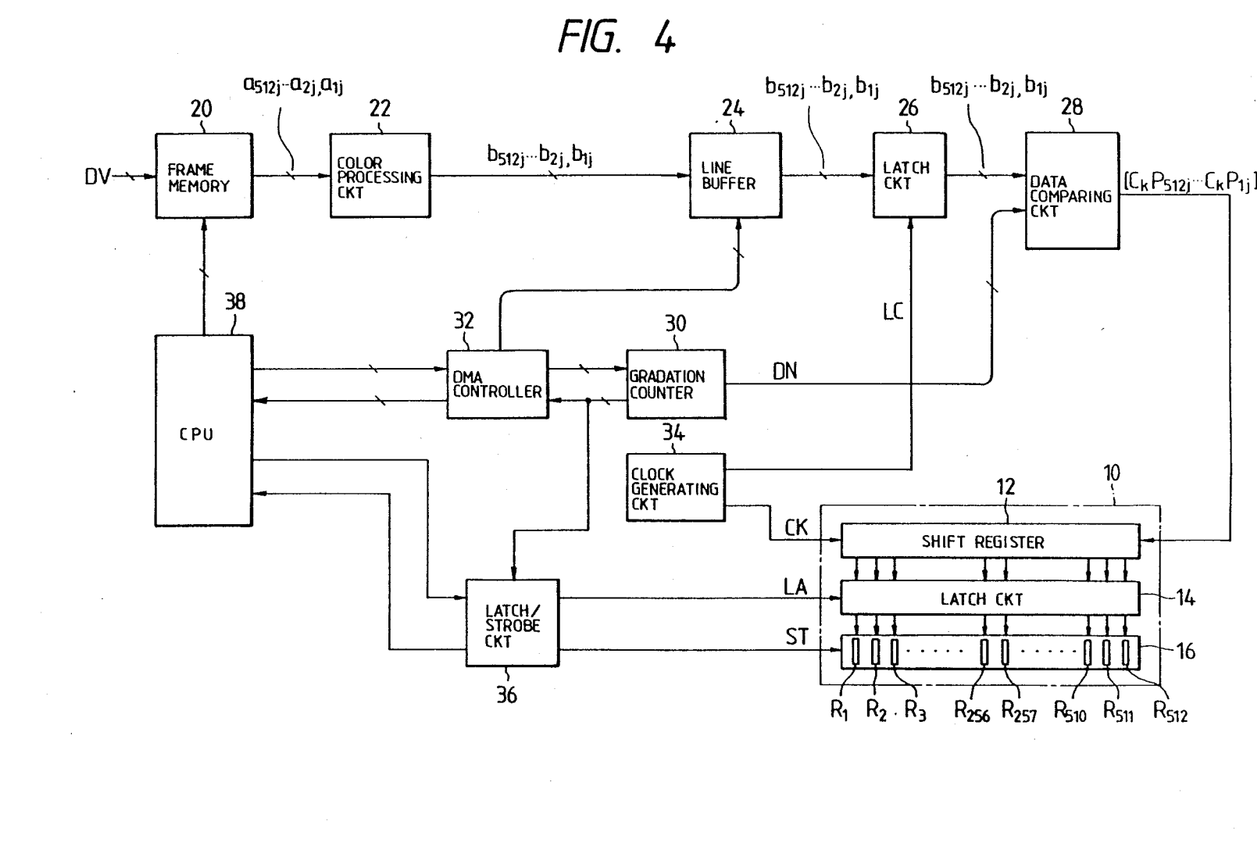
FIG. 4 is a block diagram illustrating a main circuit arrangement of a first embodiment of the density gradation control type thermal printer according to the present invention.

FIG. 4 shows a main circuit arrangement of the first embodiment of the density gradation control type thermal printer according to the present invention.

A shift register 12, a latch circuit 14 and a heating resistor 16 in a thermal head 10 may be the same in arrangement as the shift register 104, the latch circuit 106 and the heating resistor 102 in FIG. 2, respectively.

As picture element data, digital video signal DV is supplied to a frame memory 20. Each row of the frame memory 20 corresponds to one horizontal scanning line of a television picture, and the picture data are written into the rows of the frame memory 20 in the order corresponding to the raster scanning. Next, one-line picture element data $a_{1j}, a_{2j}, \ldots, a_{512j}$ are read out from the frame memory 20 row by row (j) from the first row. The readout one-line picture element data $a_{1j}, a_{2j}, \ldots, a_{512j}$ are supplied to a color processing circuit 22 in which those picture element data are subject to picture processing such as inverse gamma correction and then converted into 8-bit density data $b_{1j}, b_{2j}, \ldots, b_{512j}$ respectively. Each density data $b_{ij}$ has a value (gradation level) corresponding to the density of the corresponding picture element, for example, within a range of from ≪0≫ (the minimum density) to ≪64≫ (the maximum density).

The one-line density data $b_{1j}, b_{2j}, \ldots, b_{512j}$ produced from the color processing circuit 22 are stored in a line buffer 24 once, and then supplied through a latch circuit 26 to an input terminal of a data comparing circuit 28. In the data comparing circuit 28, the density data $b_{1j}, b_{2j}, \ldots, b_{512j}$ are converted into gradation data $[C_K P_{1j} - C_K P_{512j}]$ (K=1-64) through the following processing.

An 8-bit comparative reference data DN which is decreased one (1) by one (1) from a desired value ≪64≫ at a constant period is supplied to the other input terminal of the data comparing circuit 28 from a gradation counter 30. The data comparing circuit 28 compares each density data with the comparative reference data DN so as to produce a bit of "0" as a gradation bit when the former is not smaller than the latter, while produce a bit of "1" when the former is smaller than the latter.

For example, in the case where the values of the density data $b_{1j}, b_{2j}, b_{3j}, \ldots, b_{512j}$ as ≪64≫, ≪32≫, ≪2≫, ..., ≪50≫ respectively, the comparative reference data DN is ≪64≫ in the first comparison, and therefore the first gradation data $[C_1 P_{1j}, C_1 P_{2j} C_1 P_{3j}, \ldots C_1 P_{512j}]$ obtained at that time are $[1, 0, 0, \ldots, 0]$. In the second comparison, the comprative reference data DN is ≪63≫, and therefore the second gradation data $[C_2 P_{1j}, C_2 P_{2j}, C_2 P_{3j}, \ldots C_2 P_{512j}]$ obtained at that time are $[1, 0, 0, \ldots, 0]$. In the fifteenth comparison, the comparative reference data DN is ≪50≫ and therefore the fifteenth gradation data $[C_{15} P_{1j}, C_{15} P_{2j}, C_{15} P_{3j}, \ldots C_{15} P_{512j}]$ are $[1, 0, 0, \ldots, 1]$. In such a manner, each of the density data $b_{1j}, b_{2j}, b_{3j}, \ldots, b_{512j}$ are compared with the comparative reference data DN of the density gradation whenever the comparative reference data DN decreases by one step, and the gradation data $[C_1 P_{1j}, C_1 P_{2j}, C_1 P_{3j}, \ldots C_1 P_{512j}], [C_2 P_{1j}, C_2 P_{2j}, C_2 P_{3j}, \ldots C_2 P_{512j}], \ldots$ according to the respective comparing results are fed to the shift register 12 of the thermal head 10 sequentially in series with a constant period.

Thus, according to this embodiment, the heating resistor element $R_1$ to $R_{512}$ start current conduction in the descending order of the current conduction time for each print line, and all the heating resistor elements terminate current conduction at the same time.

Figure 5:
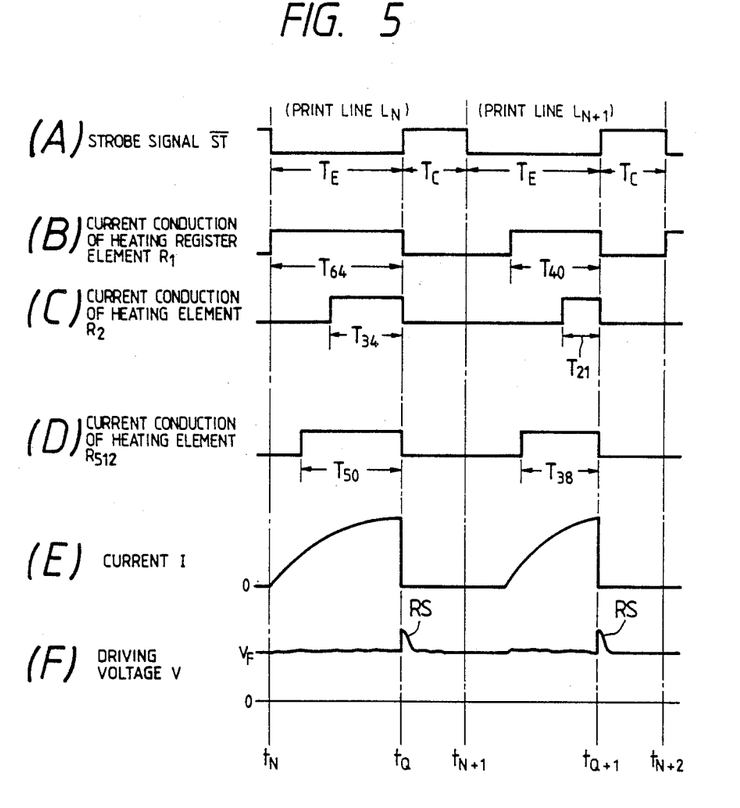
FIG. 5 is a timing chart for explaining the operation of the first embodiment.

FIG. 5 shows the operation of this embodiment. In the example in FIG. 5, the respective current conduction times of the heating resistor elements $R_1, R_2, \ldots, R_{512}$ are made equal to those in FIG. 3, for the sake of the convenience of description and the easiness of comprehension.

In printing a print line $L_N$, only the heating resistor element $R_1$ (FIG. 5B) starts current conduction immediately after the starting point of time $t_N$ of the current conduction mode TE, and the heating resistor element $R_{512}$ (FIG. 5D) and $R_2$ (FIG. 5C) start current conduction respectively at the points of time after times $T_{14}$ and $T_{30}$ have lapsed from that point of time $t_N$ respectively. The heating resistor elements $R_1, R_2, \ldots, R_{512}$ terminate current conduction simultaneously at the point of time $t_Q$ when the current conduction mode TE terminates.

Through such an operation of current conduction, the currents supplied to the whole of the heating resistor elements, that is, the whole conducting current I (FIG. 5E) increases as the number of heating resistor elements starting current conduction increases, and the whole conducting current I becomes zero suddenly at the point of time of the termination of the current conduction mode TE (at the point of time of the simultaneous termination of the current conduction of the whole heating resistor elements).

Consequently, the driving voltage V (FIG. 5F) applied to the heating resistor elements $R_1$ to $R_{512}$ connected in parallel to each other is kept at a substantially constant value $V_F$ under the condition that the whole conducting current I increase by the action of a voltage compensating circuit, while it rises momentarily only when the whole conducting current I drops down suddenly. However, since such a voltage rising RS is produced at a point of time when the mode is changed over into a cooling mode TC, the voltage rising RS does not affect the print quality.

In such a manner, according to the present invention, no sudden dropping of the driving voltage V occurs in the current conduction mode TE, so that is is not necessary to use a voltage compensating circuit of the high speed response type especially, and it is possible to obtain a stable recording quality even by a voltage compensating circuit which is slow in response speed and which is inexpensive.

A DMA controller 32 controls writing/reading of the line buffer 24 in synchronism with the counting operation of the gradation counter 30. A latch/strobe circuit 36 supplies a latch signal LA and a strobe signal $\overline{ST}$ to the thermal head 10 at a predetermined timing. A clock generating circuit 34 supplies a clock pulse CK to the sift register 12 for gradation data input operation, and at the same time, supplies a timing signal LC to the latch circuit 26 for latch operation. A CPU 38 is arranged to exchange a control signal and a timing signal with the DMA controller 32 and latch/strobe circuit 36, and to directly control writing/reading of the frame memory 20.

A second embodiment of the present invention will be described with reference to FIGS. 6 and 7.

Figure 6:
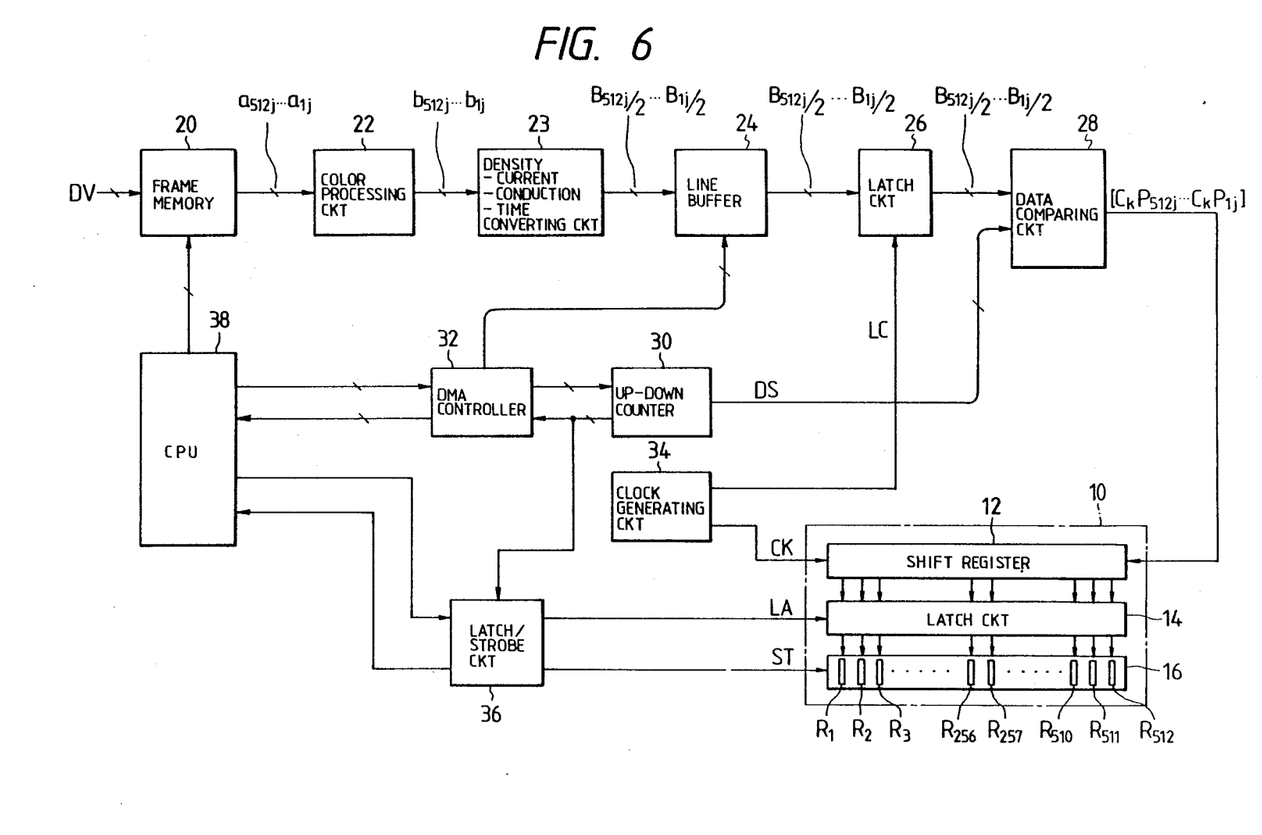
FIG. 6 is a block diagram illustrating a main circuit arrangement of a second embodiment of the density gradation control type thermal printer according to the present invention.

FIG. 6 shows a main circuit arrangement of a density gradation control type thermal printer according to the second embodiment. In FIG. 6, the parts which are the same as or equivalent to those shown in FIG. 4 are referenced correspondingly.

According to the second embodiment of the present invention, each row of the frame memory 20 corresponds to one horizontal scanning line of a television picture, and the picture data are written into the rows of the frame memory 20 in the order corresponding to the raster scanning. Next, one-line picture element data $a_{1j}, a_{2j}, \ldots, a_{512j}$ are read out from the frame memory 20 row by row (j) from the first row. The read-out one-line picture element data $a_{1j}, a_{2j}, \ldots, a_{512j}$ are supplied to a color processing circuit 22 in which those picture element data are subject to picture processing such as inverse gamma correction and then converted into 8-bit density data $b_{ij}, b_{2j}, \ldots, b_{512j}$ respectively. Each density data $b_{ij}$ has value (gradation level) corresponding to the density of the corresponding picture element, for example, within a range of from [0] (the minimum density) to [64] (the maximum density).

The one-line density data $b_{1j}, b_{2j}, \ldots, b_{512j}$ produced from the color processing circuit 22 are supplied to a density-to-current-conduction-time converting circuit 23, where each density data $b_{nj}$ are converted into current conduction time data $B_{nj}$ indicating a current conduction time ≪N≫ corresponding to its gradation level [N], and next data $B_{nj}/2$ of the half value of the data $B_{nj}$ is obtained. In such a manner, half value data of one-print-line's current conduction time $B_{1j}/2, B_{2j}/2, \ldots, B_{512j}/2$ corresponding to the one-print-line's density data $b_{1j}, b_{2j}, \ldots, b_{512j}$ are put out from the density-to-current-conduction-time /converting circuit 23, and those data $B_{1j}/2, B_{2j}/2, \ldots, B_{512j}/2$ are stored in a line buffer 24 once and then are supplied through a latch circuit 26 to one input terminal of a data comparing circuit 128, where the data $B_{1j}/2, B_{2j}/2, \ldots, B_{512j}/2$ are converted into 32-times gradation data $[C_K P_{1j} - C_K P_{512j}]$ (K=1-32) in each of the first and second half portions of the period of the current conduction mode TE through the following processing.

Into the other input terminal of the data comparing circuit 128, an 8-bits comparative reference value ES is supplied from a gradation counter 130. The gradation counter 130 constituted by an up-down counter operates as a down counter in the first half portion of the current conduction mode TE so as to output the comparative reference value ES which decreases one by one from an initial value ◀32▶ to ◀1▶ with a constant period, while operates as an up counter in the second half portion of the current conduction mode TE so as to output the comprative reference value ES which increases one by one from an initial value ◀1▶ to ◀32▶ with a constant period.

The data comparing circuit 28 compares each half value current conduction time data with the comparative reference value DS in the period of the current conduction mode TE so as to produce a bit of "1" as a gradation bit when the former is not smaller than the latter, while produce a bit of "0" when the former is smaller than the latter.

For example, in the case where the values of the density data $b_{1j}, b_{2j}, \ldots, b_{512j}$ are [20], [64], ..., [28] respectively, the values of the corresponding half value current conduction time data $B_{1j}/2, B_{2j}/2, \ldots, B_{512j}/2$ are ◀10▶, ◀32▶,..., ◀14▶ respectively.

In this case, in the first half portion of the current conduction mode Te, the comprative reference value DS is ◀32▶ in the first comparison, and therefore the d=first gradation data $[C_1 P_{1j}, C_1 P_{2j}, \ldots, c_1 P_{512j}]$ obtained then become [0, 1, ..., 0]. In the second comparison, the comparative reference value DS is ◀31▶, and the second gradation data $[C_2 P_{1j}, C_2 P_{2j}, \ldots, C_2 P_{512j}]$ become [0, 1, ..., 0]. And in the nineteenth comparison, the comparative reference value DS is ◀14▶, and the nineteenth gradation data $[C_{19} P_{1j}, C_{19} P_{2j}, \ldots, C_{19} P_{512j}]$ become [0, 1, ..., 1]. In such a manner each of the half value current conduction time data $B_{1j}/2, B_{2j}/2, \ldots, B_{512j}/2$ are compared with the comparative reference value DS whenever the comparative reference value DS decreases one by one from the initial value ◀32▶, to ◀1▶, and the gradation data $[C_1 P_{1j}, C_1 P_{2j}, \ldots, C_1 P_{512j}], [C_2 P_{1j}, C_2 P_{2j}, \ldots, c_2 P_{512j}], \ldots, [C_{32} P_{1j}, C_{32} P_{2j}, \ldots, C_{32} P_{512j}]$, according to the respective comparing results are fed to the sift register 12 of the thermal head 10 sequentially in series with a constant period.

In the second half of the current conduction mode Te, the comparative reference value DS is ◀1▶ in the first comparison, and the first gradation data $[C_1 P_{1j}, C_1 P_{2j}, \ldots, C_1 P_{512j}]$ become [1, 1, ..., 1]. In the eleventh comparison, the comparative reference value DS is ◀11▶, and the second gradation data $[C_{11} P_{1j}, C_{11} P_{2j}, \ldots, C_{11} P_{512j}]$ become [0, 1, ..., 1]. In the fifteenth comparison, the comparative reference value DS is ◀1▶, and the fifteenth gradation data $[C_{15} P_{1j}, C_{15} P_{2j}, \ldots, C_{15} P_{512j}]$ become [0, 1, ..., 0]. In such a manner, the respective half value current conduction time data $B_{1j}, B_{2j}/2, \ldots, B_{512j}/2$ are compared with the comparative reference value DS whenever the comparative reference value DS increases one by one from the initial value ◀1▶ to ◀1▶, and the gradation data $[C_1 P_{1j}, C_1 P_{2j}, \ldots, C_1 P_{512j}], [C_2 P_{1j}, C_2 P_{2j}, \ldots, c_2 P_{512j}], \ldots, [C_{32} P_{1j}, C_{32} P_{2j}, \ldots, C_{32} P_{512j}]$, according to the respective comparing results are fed to the shift register 12 of the thermal head 10 sequentially in series with a constant period.

In such a manner, the heating resistor element $R_1, R_2, \ldots, R_{512}$ start current conduction in the descending order of the current conduction time for every print line, and the heating resistor element $R_1, R_2, \ldots, R_{512}$ terminate current conduction in the ascending order of the current conduction line.

Figure 7:
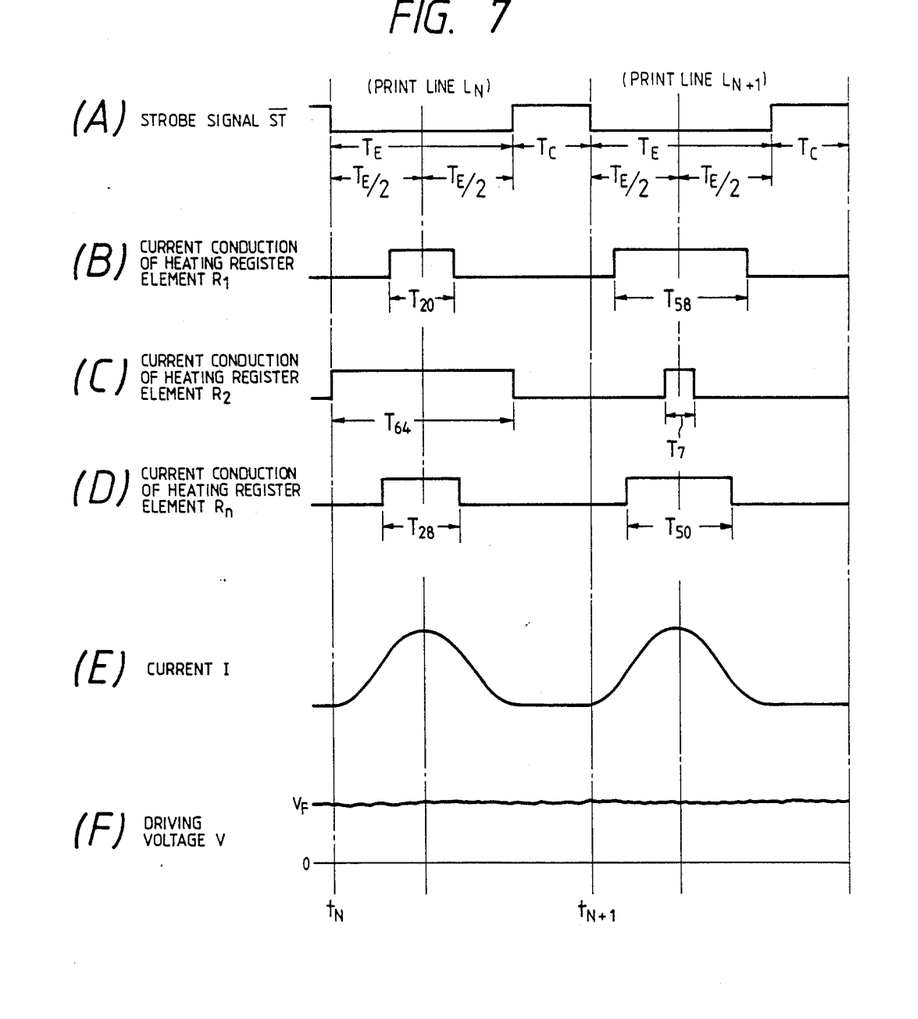
FIG. 7 is a timing chart for explaining the operation of the second embodiment.

FIG. 7 shows the operation of this second embodiment. As seen from FIG. 7, in printing a print line $L_N$, in the first half portion of the current conduction mode TE, the heating resistor elements $R_1, R_2, \ldots, R_{512}$ start current conduction in the descending order of the current conduction time, that is, from the heating resistor element $R_2$ hose current conduction time is the longest, and the current conduction of the whole of heating resistor elements to be conducted is achieved at the end of the first half portion of the current conduction mode TE. In the second half portion of the current conduction mode TE, the heating resistor elements $R_1, R_2, \ldots, R_{512}$ terminate their current conduction in the ascending order of current conduction time from a heating resistor element whose current conduction time is the shortest, and the whole of heating resistor elements become in a not-current-conduction state at the end of the second half portion of the current conduction mode TE.

Through such an operation of current conduction, the whole conducting current I (FIG. 7E) supplied to the whole of the heating resistor elements increases gradually with the increase in number of the heating resistor elements which have started current conduction in the first half portion of the current conduction mode TE, and decreases gradually with the increase in number of the heating resistor elements which have terminated current conduction (the decrease in number of the heating resistor elements which maintain current conduction) in the second half portion of the current conduction mode TE till it becomes zero at the end of the current conduction mode TE.

Consequently, the driving voltage V (FIG. 7F) applied to the heating resistor elements $R_1$ to $R_{512}$ connected in parallel to each other is kept at an almost constant value $V_F$ under the change of the whole conducting current I even in the case of using a voltage compensating circuit which is low in response speed.

In such a manner, according to the second embodiment, there occurs no sudden dropping and rising the driving voltage V so that it is not necessary to use a voltage compensating circuit of the high speed response type especially, and it is possible to obtain stable recording quality even in the case of using a voltage compensating circuit which is low in response speed and which is inexpensive.

Besides these embodiment, various changes and modifications may be made in the present invention without departing from the spirit and scope thereof.

As has been described above, according to the present invention, since the arrangement is made such that the heating resistor elements start current conduction in the descending order of current conduction time for every print line and the respective heating resistor elements terminate current conduction at the same time, the conducting current increase with the increase in number of the heating resistor elements which have started current conduction, so that there occurs no sudden change in the driving voltage.

Alternatively, the arrangement may be made such that the heating resistor elements start current conduction in the descending order of current conduction time for every print line and terminate current conduction in the ascending order of current conduction time. In this case, there is provided a difference in time in the timing of start and termination of current conduction of each heating resistor element in accordance with the length of its current conduction time, so that the conducting current supplied to the whole heating resistor elements is prevented from increasing or decreasing suddenly to thereby prevent a sudden change from occurring in the driving voltage.

As has been described, according tot he present invention, it is possible to obtain stable print quality even in the case of using a voltage compensating circuit which is low in response speed.

What is claimed is:

1. A density gradation control type thermal printer for printing a plurality of print lines, each having a plurality of picture elements, comprising:
    a plurality of heating resistor elements arranged in one-to-one correspondence with said plurality of picture elements on every print line;
    first means for selectively energizing said heating resistor elements for each print line into current conduction, each for a time equivalent to an integer multiple of a current conduction unit time, to thereby give density gradation to said picture elements; and
    second means for selectively starting said energizing in a descending order of current conduction time for every print line.

2. The density gradation control type thermal printer of claim 1, wherein said second means terminates said heating resistor elements current conduction at the same time.

3. A density gradation control type thermal printer for printing a plurality of print lines, each having a plurality of picture elements, comprising:
    a plurality of heating resistor elements arranged in one-to-one correspondence with said plurality of picture elements on every print line;
    first means for selectively energizing said heating resistor elements for each print line into current conduction, each for a time equivalent to an integer multiple of a current conduction unit time, to thereby give density gradation to said picture elements and;
    second means for selectively starting said energizing in a descending order of current conduction time for every print line, and terminating said heating resistor elements current conduction at the same time, wherein said second means comprises:
    means for supplying comparative reference data which is decreased one by one from a desired value at a constant period; and
    means for comparing each density data with said comparative reference data whereby producing a bit of zero as a gradation bit when the former is not smaller than the latter.

4. The density gradation control type thermal printer of claim 1, wherein said second means terminates said heating resistor elements current conduction in the ascending order.

5. A density gradation control type thermal printer for printing a plurality of print lines, each having a plurality of picture elements, comprising:
    a plurality of heating resistor elements arranged in one-to-one correspondence with said plurality of picture elements on every print line;
    first means for selectively energizing said heating resistor elements for each print line into current conduction, each for a time equivalent to an integer multiple of a current conduction unit time, to thereby give density gradation to said picture elements and;
    second means for selectively starting said energizing in a descending order of current conduction time for every print line and terminating said heating resistor elements current conduction in ascending order, wherein said second means comprises:
    an up-down counter operating as a down counter in the first half portion of the current conduction mode whereby outputting said comparative reference value which decreases one by one from an initial value with a constant period, and operating as an up counter in the second half portion of the current conduction mode whereby outputting said comparative reference value which increases one by one from said initial value with a constant period; and means for comparing each half value current conduction time data with said comparative reference value in the period of the current conduction mode whereby producing a bit of "1" as a gradation bit when the former is not smaller than the latter, while producing a bit of zero when the former is smaller than the latter.

* * * * *